(12) United States Patent
Blank et al.

(10) Patent No.: US 8,683,348 B1
(45) Date of Patent: Mar. 25, 2014

(54) MODIFYING SOFTWARE BASED ON A USER'S EMOTIONAL STATE

(75) Inventors: Bennett R. Blank, San Diego, CA (US); David J. Snow, San Diego, CA (US); Michelle D. McAlister, San Diego, CA (US)

(73) Assignee: Intuit Inc., Mountain View, CA (US)

(*) Notice: Subject to any disclaimer, the term of this patent is extended or adjusted under 35 U.S.C. 154(b) by 527 days.

(21) Appl. No.: 12/835,948

(22) Filed: Jul. 14, 2010

(51) Int. Cl.
*G06F 3/00* (2006.01)

(52) U.S. Cl.
USPC .......................................... 715/745; 715/709

(58) Field of Classification Search
USPC ................... 715/745, 709, 705, 708
See application file for complete search history.

(56) References Cited

U.S. PATENT DOCUMENTS

| | | | |
|---|---|---|---|
| 6,585,521 B1* | 7/2003 | Obrador | 434/236 |
| 7,930,676 B1* | 4/2011 | Thomas | 717/100 |
| 7,944,448 B2* | 5/2011 | Iwamura et al. | 345/473 |
| 2006/0206471 A1* | 9/2006 | Tsuzuki et al. | 707/3 |
| 2008/0022203 A1* | 1/2008 | Fernandez | 715/716 |
| 2008/0215631 A1* | 9/2008 | Abraham et al. | 707/104.1 |
| 2009/0281398 A1* | 11/2009 | Hogan | 600/301 |
| 2010/0107075 A1* | 4/2010 | Hawthorne et al. | 715/708 |
| 2010/0180238 A1* | 7/2010 | Lanfermann et al. | 715/865 |
| 2011/0239137 A1* | 9/2011 | Bill | 715/757 |

\* cited by examiner

*Primary Examiner* — Omar Abdul-Ali
(74) *Attorney, Agent, or Firm* — Park, Vaughan, Fleming & Dowler LLP; Steven E. Stupp

(57) ABSTRACT

A technique for modifying a user experience associated with a software product is described. During this modification technique, behavioral metrics that are associated with a user's emotional state are collected while the user is using the software product. For example, the behavioral metrics may include: usage patterns, user gestures and/or user tactile inputs. Furthermore, using the collected behavioral metrics, the user's emotional state is determined. Then, the user experience is modified based on the determined emotional state.

23 Claims, 6 Drawing Sheets

```
┌─ 100
│
COLLECT BEHAVIORAL METRICS THAT ARE ASSOCIATED WITH A USER'S
EMOTIONAL STATE WHILE THE USER IS USING A SOFTWARE PRODUCT
110
        ↓
DETERMINE AN EMOTIONAL STATE BASED ON THE COLLECTED BEHAVIORAL
METRICS
112
        ↓
MODIFY THE USER EXPERIENCE BASED ON THE DETERMINED EMOTIONAL
STATE
114
```

US 8,683,348 B1

MODIFYING SOFTWARE BASED ON A USER'S EMOTIONAL STATE

BACKGROUND

The present disclosure relates to a software product. More specifically, the present disclosure relates to techniques for modifying a user experience associated with the software product based on a user's emotional state.

The user experience offered by many existing software products is often inadequate. For example, the functionality provided by a given release of a software product is typically the same for all users and is time invariant. As a consequence, the software product is often unable to respond to user needs.

This is particularly problematic for users who are having difficulty using a software product. As a user's frustration grows, the standard features and fixed functionality of the software product cannot be adapted to assist the user. This exacerbates the user's frustration, which degrades the overall user experience, and reduces the user's satisfaction with the software product. Thus, these problems with existing software products can lead users to discontinue using these products, which can adversely impact the market share and revenue of companies that develop and/or provide software products.

SUMMARY

The disclosed embodiments relate to a computer system that modifies a user experience associated with a software product. During operation, the computer system collects behavioral metrics that are associated with a user's emotional state while the user is using the software product. Then, the computer system determines the emotional state based on the collected behavioral metrics. Next, the computer system modifies the user experience based on the determined emotional state.

Note that the behavioral metrics may include: a time duration that the user views a document provided by the software product; user interest in help content associated with the software product; an idle time when the user is viewing the document; a time of day; a speed with which the user answers questions in the document; an elapsed time since a previous user session; a user rating of the software product; and/or a comparison of user outcomes with those of other users. Alternatively or additionally, the behavioral metrics may include: user facial expressions; user tactile pressure when interacting with a user interface; user gestures; user posture; and/or user errors when using the software product.

In some embodiments, the behavioral metrics are collected without interrupting normal activities of the user when using the software product. Alternatively or additionally, the behavioral metrics may be collected via a game that the user plays. For example, the game may assess current user cognitive processes. Furthermore, the game may be played concurrently with use of the software product.

Moreover, determining the emotional state may involve: selecting one of a set of predefined emotional states and/or calculating a weighted sum of the collected behavioral metrics. In some embodiments, determining the emotional state involves comparing the weighted sum to a threshold.

Additionally, modifying the user experience may involve: changing a path in a process associated with the software product; changing a displayed information density in a document associated with the software product; changing lexicography in the document; and/or changing a visual format of information in the document.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for modifying a user experience associated with a software product, and a computer-program product (e.g., software) for use with the computer system are described. During this modification technique, behavioral metrics that are associated with a user's emotional state are collected while the user is using the software product. For example, the behavioral metrics may include: usage patterns, user gestures and/or user tactile inputs. Furthermore, using the collected behavioral metrics, the user's emotional state is determined. Then, the user experience is modified based on the determined emotional state.

By determining the user's emotional state and accordingly modifying the user experience, this modification technique may facilitate an improved user experience with the software product. Moreover, the modification technique may collect the behavioral metrics without disturbing the user's normal behavior when using the software product. For example, the behavioral metrics may be collected without asking the user questions. Consequently, the modification technique may improve customer satisfaction and retention, which may improve the market share and revenue of a company that developed and/or provides the software product.

In the discussion that follows, the user may include one or more of a variety of entities, such as: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
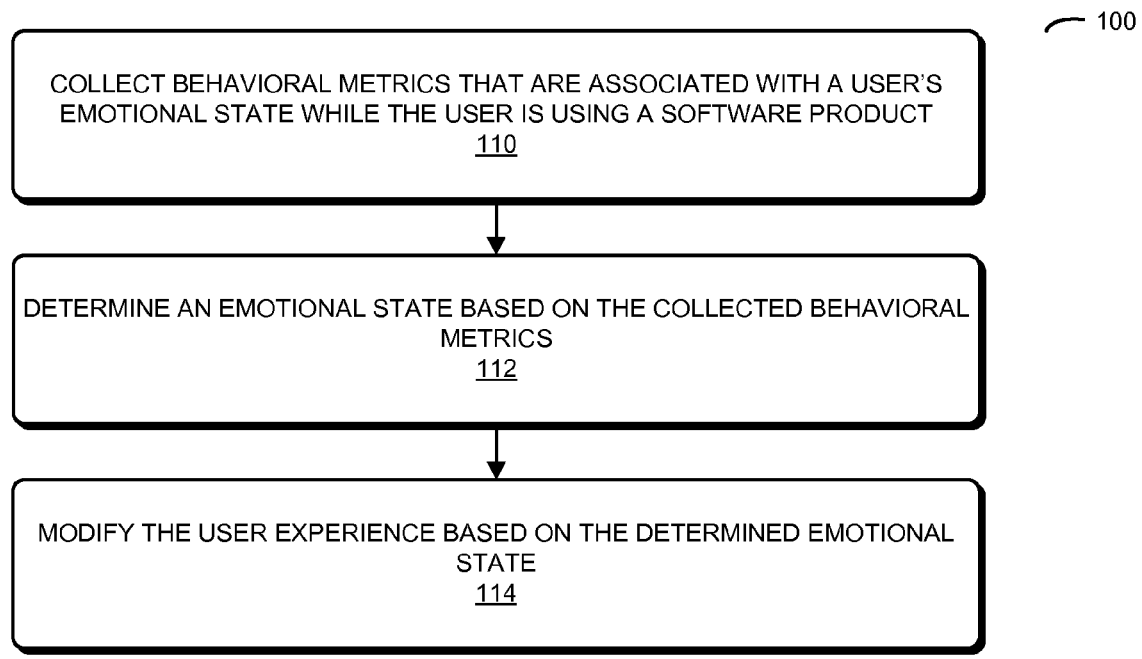
FIG. 1 is a flow chart illustrating a method for modifying a user experience associated with a software product in accordance with an embodiment of the present disclosure.

We now describe embodiments of the modification technique. FIG. 1 presents a flow chart illustrating a method 100 for modifying a user experience associated with a software product, which may be performed by a computer system (such as computer systems 400 in FIG. 4 and/or 500 in FIG. 5). During operation, the computer system collects behavioral metrics that are associated with a user's emotional state while the user is using the software product (operation 110). For example, the behavioral metrics may include: a time duration that the user views a document (such as a web page, a screen or a window) provided by the software product; user interest in help content associated with the software product; an idle time when the user is viewing the document; a time of day; a speed with which the user answers questions in the document; an elapsed time since a previous user session; a user rating of the software product (which is a metric for customer satisfaction); and/or a comparison of user outcomes with those of other users. Alternatively or additionally, the behavioral metrics may include: user facial expressions; user tactile pressure when interacting with a user interface; user gestures; user posture when using the software product; and/or user errors when using the software product (which may be determined based on the user using a delete icon or performing a 'cut' operation).

Note that the behavioral metrics may be collected without interrupting normal activities of the user when using the software product, e.g., without forcing the user to answer questions. (Thus, the user's emotional state may be determined using the user's actual behavior when using the software product). Alternatively or additionally, the behavioral metrics may be collected via a game that the user plays. For example, the game may assess current user cognitive processes. Furthermore, the game may be played concurrently with use of the software product.

Then, the computer system determines the emotional state based on the collected behavioral metrics (operation 112). For example, determining the emotional state may involve selecting one of a set of predefined emotional states (such as 'happy,' 'frustrated,' etc.). Furthermore, the user's emotional state may be determined by calculating a weighted sum of the collected behavioral metrics. Then, a result of this weighted sum may be compared to one or more thresholds, which may 'bin' or associate the user with one of the set of predefined emotional states.

Next, the computer system modifies the user experience based on the determined emotional state (operation 114). In particular, modifying the user experience may involve changing a path in a process associated with the software product, e.g., modifying a flow in the software product so that: a different guidance, a different user interface, different functionality or, more generally, a different feature is presented to the user based on their emotional state. Alternatively or additionally, modifying the user experience may involve changing a displayed information density in a document associated with the software product (such as reducing the amount of displayed text in a web page or a displayed window); changing lexicography in the document (such as using a simpler or alternate explanation of how to use the software product); and/or changing a visual format of information in the document (such as changing the color or the font size of content in the window, or using more visual information and less text). For example, if the user is frustrated, the information in a window shown on a display by the software product may be spread out over multiple windows so that it is easier for the user to read and use. In some embodiments, modifying the user experience involves providing personalized marketing offers or, more generally, advertising content to the user of the software product. This may leverage the user's determined emotional state to identify users who are: more interested in the marketing offers, more likely to accept the marketing offers, and/or more willing to pay more for the products and/or services associated with the marketing offers.

Thus, method 100 may allow the software product to be modified (or adapted) to improve the user's experience (and, thus, the user's satisfaction) as the user's emotional state evolves when using the software product. Note that the software product may be modified: once, periodically, as needed (such as when there is a change in the user's emotional state) and/or dynamically (such as in real time while the user is using the software product).

Figure 2:
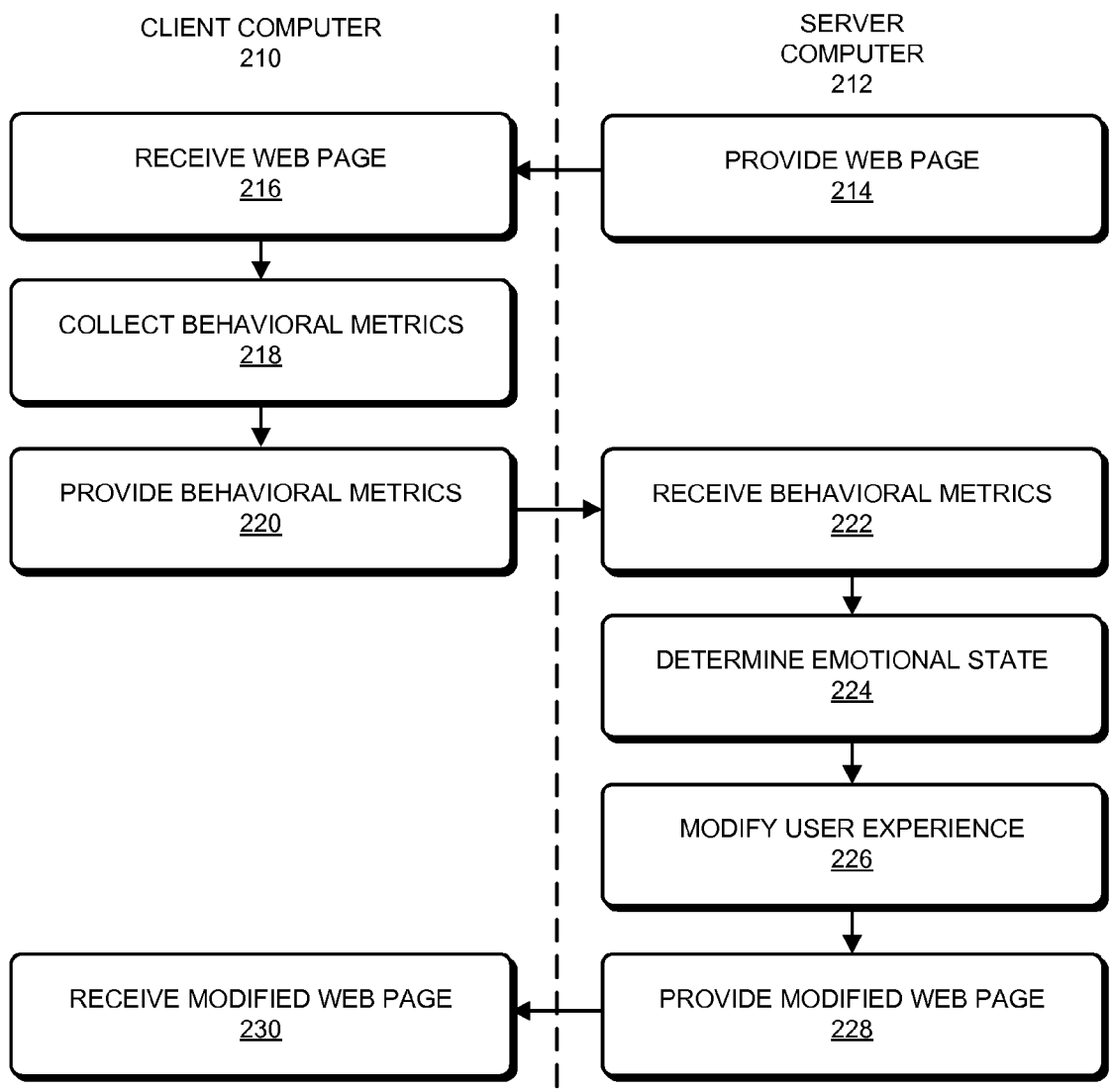
FIG. 2 is a flow chart illustrating the method of FIG. 1 in accordance with an embodiment of the present disclosure.

In an exemplary embodiment, the modification technique is implemented using one or more client computers and at least one server computer, which communicate through a network, such as the Internet (i.e., using a client-server architecture). This is illustrated in FIG. 2, which presents a flow chart illustrating method 100. During this method, server computer 212 provides a web page (operation 214) associated with the software product to a user of client computer 210. After receiving the web page (operation 216), behavioral metrics that are associated with a user's emotional state while the user is using the software product are collected (operation 218) and provided (operation 220) to server computer 212.

After receiving the collected behavioral metrics (operation 222), server computer 212 determines the emotional state based on the collected behavioral metrics (operation 224). Next, server computer 212 modifies the user experience based on the determined emotional state (operation 226), for example, by modifying the web page. This modified web page is provided to the user (operation 228), who subsequently receives it (operation 230) at client computer 210.

In some embodiments of method 100 (FIGS. 1 and 2), there may be additional or fewer operations. Moreover, the order of the operations may be changed, and/or two or more operations may be combined into a single operation.

In an exemplary embodiment, the modification technique of method 100 is used to determine a user's emotional state as they interact with a software product. This emotional state may be determined by measuring one or more behavioral metrics that are predetermined indicators of the user's emotional state, such as: the amount of time the user is on or viewing a web page, user interest in help (as indicated, for example, by the user activating a help icon with their mouse), the time of day (users may be more relaxed in the evening), user idle time when using the software product, a speed of user answers, user progress in using the software product (such as how far along they are), when the user last used the software product (where a long delay may indicate user frustration), user interaction with the software product, etc.

In some embodiments, 'social' data is used during the modification technique. In particular, the experience and outcomes of other users may be used when determining the user's emotional state. For example, what did other users do on a given web page? What was their determined emotional state when using a given web page? What kind of evaluations of the software product did these users provide? This social information may allow the use of the previous aggregate experiences of other users to help determine the user's current emotional state.

Note that these behavioral metrics may be captured in real time as the user uses the software product, or aggregated metrics may be collected at the end of a user session. In addition, note that the behavioral metrics that are collected may be tailored or customized for a particular software product, and even for different portions of the software product (such as different web pages or different modules).

Once the user's emotional state has been determined, the user experience associated with the software product can be modified or changed specifically for the user's current state of mind. Thus, more help content or options may be displayed to a user who is frustrated. Alternatively, if a user is happy, support options may be hidden, and the user may be allowed or encouraged to tell others about their experience with the software product. This capability may help prevent the loss of customers who are experiencing strong negative emotions when using the software product, and may allow the software product to delight happy customers.

Figure 3:
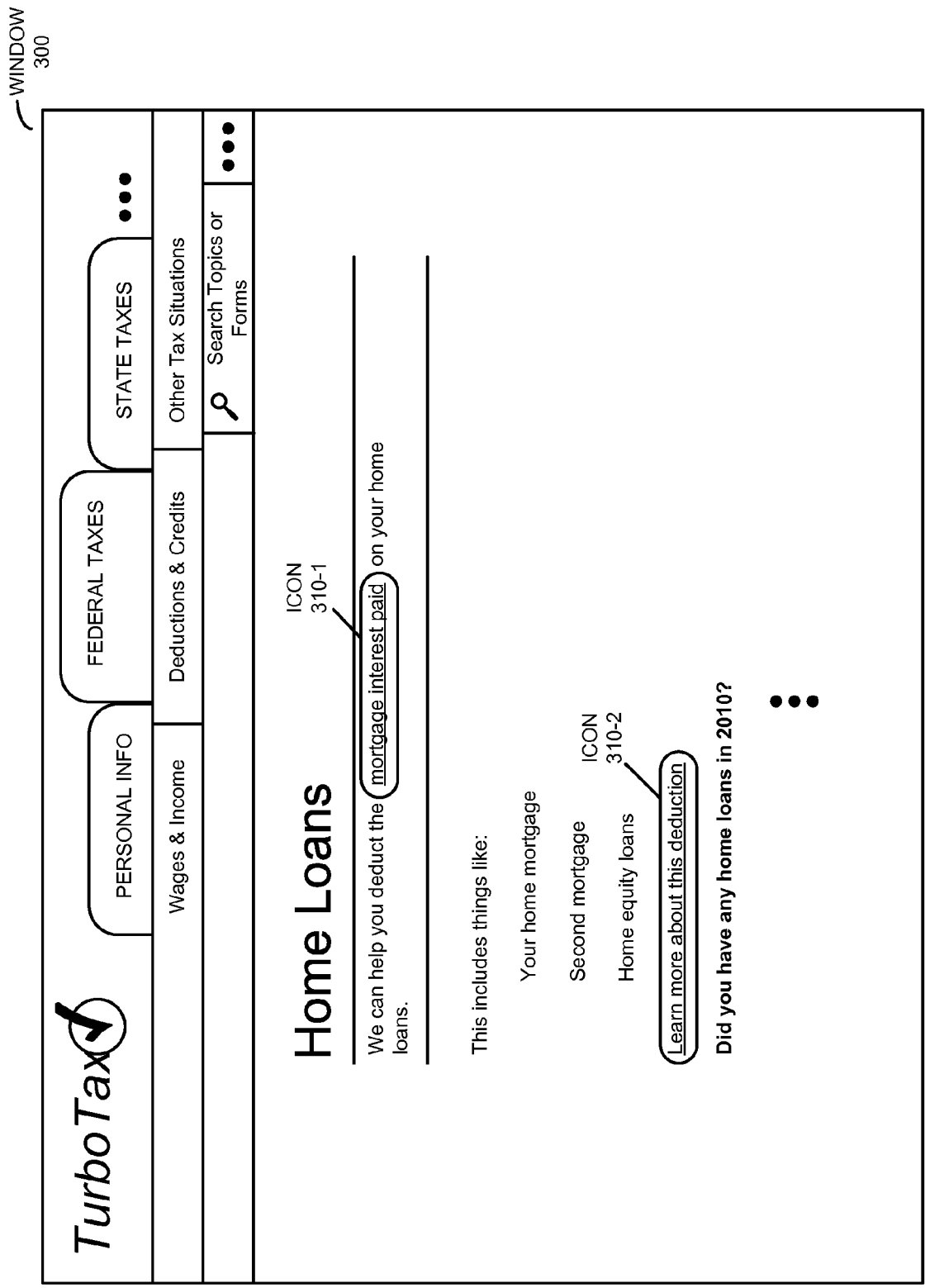
FIG. 3 is a block diagram illustrating a window associated with a software product in accordance with an embodiment of the present disclosure.

An illustration of behavioral metrics that can be collected is shown in FIG. 3, which presents a block diagram illustrating a window 300 associated with a software product. In particular, window 300 is associated with income-tax preparation software, and includes icons 310 (such as hyperlinks) that allow the user to view definitions and additional help content. By activating one or more of these icons frequently (such as more than once during a user session or when viewing window 300), the user's behavior may indicate that they are confused or frustrated and in need of additional assistance or guidance. Once this user emotional state has been determined, window 300 may be modified so that there is a simpler flow of subsequent windows and screens or additional help content, and the language used may be easier to understand and more comforting to the user's state of mind.

Figure 4:
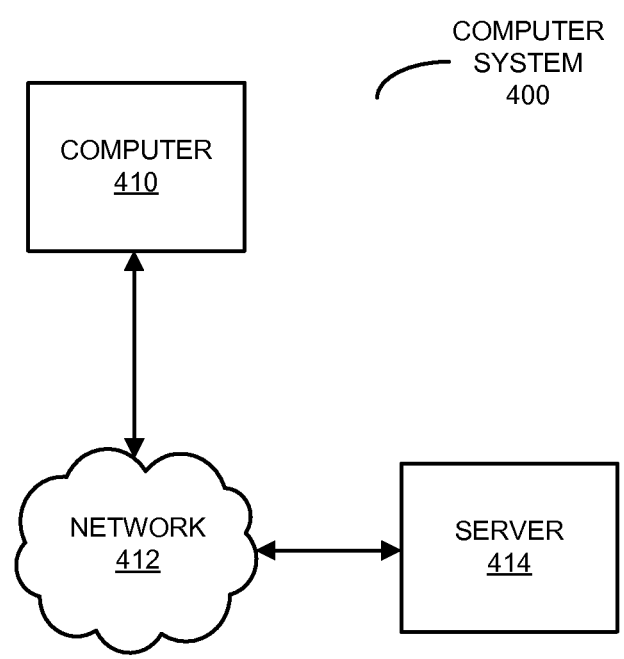
FIG. 4 is a block diagram illustrating a computer system that performs the method of FIGS. 1 and 2 in accordance with an embodiment of the present disclosure.

We now describe embodiments of the computer system and its use. FIG. 4 presents a block diagram illustrating a computer system 400 that performs method 100 (FIGS. 1 and 2). In this system, a user of computer 410 may use a software product. For example, the user may interact with a web page that is provided by server 414 via network 412, and which is rendered by a web browser on computer 410. Alternatively, the user may use a software application that is resident on and that executes on computer 410. This software application may be a stand-alone application or a portion of another application that is resident on and which executes on computer 410 (such as financial software that is provided by server 414 or that is installed and which executes on computer 410).

In some embodiments, at least a portion of the software application may be an application tool (such as a software application tool) that is embedded in the web page (and which executes in a virtual environment of the web browser). In an illustrative embodiment, the software application tool is a software package written in: JavaScript™ (a trademark of Oracle Corporation), e.g., the software application tool includes programs or procedures containing JavaScript instructions, ECMAScript (the specification for which is published by the European Computer Manufacturers Association International), VBScript™ (a trademark of Microsoft Corporation) or any other client-side scripting language. In other words, the embedded software application tool may include programs or procedures containing: JavaScript, ECMAScript instructions, VBScript instructions, or instructions in another programming language suitable for rendering by the web browser or another client application (such as on computer 410). Thus, the software application tool may be provided to the user via a client-server architecture.

As discussed previously, user behavioral metrics may be collected while the user uses the software application. Based on the collected behavioral metrics, the user's emotional state may be determined (either at computer 410 and/or at server 414). Furthermore, this determined emotional state may be used to modify the user experience. For example, server 414 may modify the web page, and revised instructions may be communicated via network 412 to computer 410 for rendering by the web browser.

Note that the information in computer system 400 (such as the collected behavioral metrics) may be stored at one or more locations in computer system 400 (i.e., locally or remotely). Moreover, because this information may be sensitive in nature, it may be encrypted. For example, stored information and/or information communicated via network 412 may be encrypted.

Figure 5:
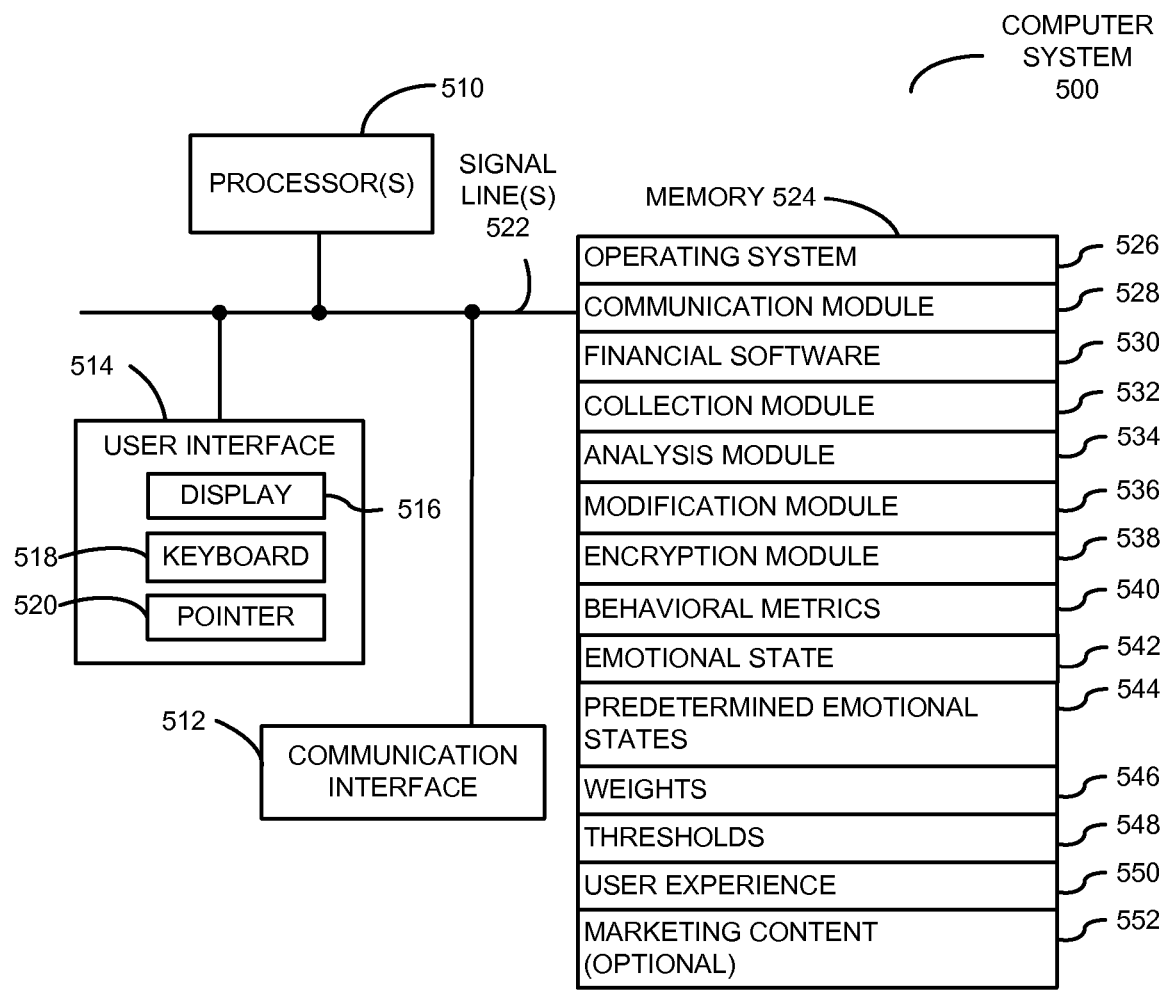
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2), such as server 414 (FIG. 4). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500. While not shown in FIG. 5, in some embodiments memory 524 includes a web browser.

Memory 524 may also include multiple program modules (or sets of instructions), including: financial software 530 (or a set of instructions), collection module 532 (or a set of instructions), analysis module 534 (or a set of instructions), modification module 536 (or a set of instructions), and/or encryption module 538 (or a set of instructions). Note that one or more of these program modules (or sets of instructions) may constitute a computer-program mechanism.

Figure 6:
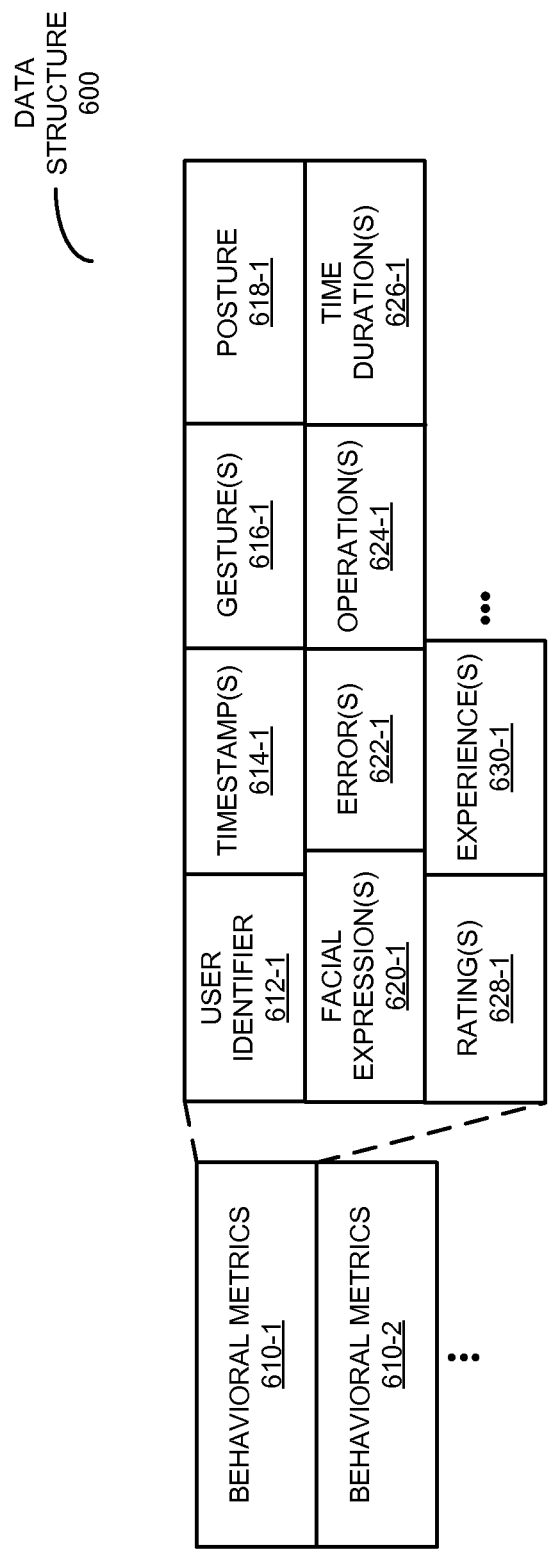
FIG. 6 is a block diagram illustrating a data structure for use in the computer system of FIG. 5 in accordance with an embodiment of the present disclosure.

During method 100 (FIG. 1), a user may use financial software 530, and collection module 532 may collect one or more behavioral metrics 540. These collected behavioral metrics may be stored in a non-transitory, computer-readable data structure. This data structure is shown in FIG. 6, which presents a block diagram illustrating a data structure 600. In particular, data structure 600 may include information about behavioral metrics 610, which are collected at different times for one or more users. For example, behavioral metrics 610-1 may include: a user identifier 612-1, one or more timestamps 614-1, one or more gestures 616-1, one or more measures of user posture 618-1, one or more facial expressions 620-1, one or more errors 622-1 committed by the user when using the software product, one or more operations 624-1 performed by the user, associated time durations 626-1, one or more ratings 628-1 from the user or other users, experiences of other users 630-1, etc.

Referring back to FIG. 5, using collected behavioral metrics 540, analysis module 534 may determine the user's emotional state 542. This determination may be based on predetermined emotional states 544. In some embodiments, the user's emotional state is determined by calculating a weighted summation of one or more of behavioral metrics 540 (using weights 546) and comparing the resulting score to one or more thresholds 548.

Using the determined emotional state 542, modification module 536 may modify a user experience 550 associated with financial software 530. For example, a web page associated with financial software 530 may be modified. In some embodiments, modifying the user experience involves including optional marketing content 552 in financial software 530.

Furthermore, because behavioral metrics 540 and/or emotional state 542 may be sensitive in nature, in some embodiments at least some of the information stored in memory 524 and/or at least some of the information communicated using communication module 528 is encrypted using encryption module 538. Additionally, in some embodiments one or more of the modules in memory 524 may be included in financial software 530.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over a large number of servers or computers, with various groups of the servers or computers performing particular subsets of the functions. In some embodiments, some or all of the functionality of computer system 500 may be implemented in one or more application-specific integrated circuits (ASICs) and/or one or more digital signal processors (DSPs).

Computers and servers in computer systems 400 (FIG. 4) and/or 500 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture).

Moreover, network 412 (FIG. 4) may include: the Internet, World Wide Web (WWW), an intranet, LAN, WAN, MAN, or a combination of networks, or other technology enabling communication between computing systems.

In exemplary embodiments, the financial-software application (i.e., financial software 530) includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Window 300 (FIG. 3), computer system 400 (FIG. 4), computer system 500 (FIG. 5) and/or data structure 600 may include fewer components or additional components. Moreover, two or more components may be combined into a single component, and/or a position of one or more components may be changed. In some embodiments, the functionality of computer systems 400 (FIG. 4) and/or 500 may be implemented more in hardware and less in software, or less in hardware and more in software, as is known in the art.

While the preceding discussion illustrated the use of the modification technique to change the user experience associated with software products such as financial software, more generally this approach may be used to modify the user experience (and to facilitate improved customer satisfaction and retention) with a wide variety of types of software programs and applications, including: word-processing software, medical software, spreadsheet software, presentation software, an email program, mathematical software, etc. In some embodiments, a provider of the modification technique may offer or provide it as a service to third-party software developers or providers.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for modifying a user experience associated with a software product, comprising:
   collecting behavioral metrics that are associated with a user's emotional state while the user is using the software product;
   determining, using a computer, the emotional state based on the collected behavioral metrics; and
   modifying the user experience based on the determined emotional state by changing a path in a process associated with the software product, wherein said changing involves modifying a flow in the software product so that at least a different user interface is presented based on the emotional state, wherein the different user interface includes additional content in the software product that enables the user to provide user inputs to the document with ease.

2. The method of claim 1, wherein the behavioral metrics include at least one of:
   a time duration that the user views a document provided by the software product;

user interest in help content associated with the software product;
an idle time when the user is viewing the document;
a time of day;
a speed with which the user answers questions in the document;
an elapsed time since a previous user session;
a user rating of the software product; and
a comparison of user outcomes with those of other users.

3. The method of claim 1, wherein the behavioral metrics include at least one of:
user facial expressions;
user tactile pressure when interacting with a user interface;
user gestures;
user posture; and
user errors when using the software product.

4. The method of claim 1, wherein the behavioral metrics are collected without interrupting normal activities of the user when using the software product.

5. The method of claim 1, wherein the behavioral metrics are collected via a game that the user plays.

6. The method of claim 5, wherein the game assesses current user cognitive processes.

7. The method of claim 5, wherein the game is played concurrently with use of the software product.

8. The method of claim 1, wherein determining the emotional state involves selecting one of a set of predefined emotional states.

9. The method of claim 1, wherein determining the emotional state involves calculating a weighted sum of the collected behavioral metrics.

10. The method of claim 9, wherein determining the emotional state involves comparing the weighted sum to a threshold.

11. The method of claim 1, wherein modifying the user experience involves changing a displayed information density in a document associated with the software product.

12. The method of claim 1, wherein modifying the user experience involves changing lexicography in a document associated with the software product.

13. The method of claim 1, wherein modifying the user experience involves changing a visual format of information in a document associated with the software product.

14. A non-transitory computer-program product for use in conjunction with a computer system, the computer-program product comprising a computer-readable storage medium and a computer-program mechanism embedded therein, to facilitate modifying a user experience associated with a software product, the computer-program mechanism including:
instructions for collecting behavioral metrics that are associated with a user's emotional state while the user is using the software product;
instructions for determining the emotional state based on the collected behavioral metrics; and
instructions for modifying the user experience based on the determined emotional state by changing a path in a process associated with the software product, wherein said changing involves modifying a flow in the software product so that at least a different user interface is presented based on the emotional state, wherein the different user interface includes additional content in the software product that enables the user to provide user inputs to the document with ease.

15. The method of claim 1, wherein changing the path in the process associated with the software product involves modifying a flow in the software product so that a personalized marketing offer, a different guidance, different functionality, or a different feature is presented based on the emotional state.

16. The computer-program product of claim 14, wherein the behavioral metrics include at least one of:
a time duration that the user views a document provided by the software product;
user interest in help content associated with the software product;
an idle time when the user is viewing the document;
a time of day;
a speed with which the user answers questions in the document;
an elapsed time since a previous user session;
a user rating of the software product; and
a comparison of user outcomes with those of other users.

17. The computer-program product of claim 14, wherein the behavioral metrics include at least one of:
user facial expressions;
user tactile pressure when interacting with a user interface;
user gestures;
user posture; and
user errors when using the software product.

18. The computer-program product of claim 14, wherein determining the emotional state involves selecting one of a set of predefined emotional states.

19. The computer-program product of claim 14, wherein determining the emotional state involves calculating a weighted sum of the collected behavioral metrics.

20. The computer-program product of claim 14, wherein modifying the user experience involves changing a displayed information density in a document associated with the software product.

21. The computer-program product of claim 14, wherein modifying the user experience involves changing lexicography in a document associated with the software product.

22. The computer-program product of claim 14, wherein modifying the user experience involves changing a visual format of information in a document associated with the software product.

23. A computer system, comprising:
a processor;
memory; and
a program module, wherein the program module is stored in the memory and configurable to be executed by the processor to facilitate modifying a user experience associated with a software product, the program module including:
instructions for collecting behavioral metrics that are associated with a user's emotional state while the user is using the software product;
instructions for determining the emotional state based on the collected behavioral metrics; and
instructions for modifying the user experience based on the determined emotional state by changing a path in a process associated with the software product, wherein said changing involves modifying a flow in the software product so that at least a different user interface is presented based on the emotional state, wherein the different user interface includes additional content in the software product that enables the user to provide user inputs to the document with ease.

* * * * *